United States Patent
Petkov et al.

(10) Patent No.: US 10,820,070 B2
(45) Date of Patent: Oct. 27, 2020

(54) METHOD FOR TRANSMITTING DATA

(71) Applicant: DIEHL METERING SYSTEMS GMBH, Nuremberg (DE)

(72) Inventors: Hristo Petkov, Nuremberg (DE); Thomas Lautenbacher, Erlangen (DE); Thomas Kauppert, Nuremberg (DE); Raphael Mzyk, Kammerstein (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/234,907

(22) Filed: Dec. 28, 2018

(65) Prior Publication Data
US 2019/0387289 A1 Dec. 19, 2019

(30) Foreign Application Priority Data
Jun. 15, 2018 (DE) .................. 10 2018 004 828

(51) Int. Cl.
*H04Q 9/02* (2006.01)
*G01D 4/00* (2006.01)

(52) U.S. Cl.
CPC ............ *H04Q 9/02* (2013.01); *G01D 4/004* (2013.01); *H04Q 2209/40* (2013.01); *H04Q 2209/60* (2013.01); *H04Q 2209/826* (2013.01)

(58) Field of Classification Search
CPC .. H04Q 9/02; H04Q 2209/40; H04Q 2209/60; H04Q 2209/826; G01D 4/004
See application file for complete search history.

(56) References Cited

U.S. PATENT DOCUMENTS

| | | | |
|---|---|---|---|
| 8,832,428 B2* | 9/2014 | Ota | H04W 12/04 713/153 |
| 9,612,132 B2* | 4/2017 | Borleske | G01D 4/002 |
| 2007/0153690 A1* | 7/2007 | Stanwood | H04W 72/1236 370/230 |

(Continued)

FOREIGN PATENT DOCUMENTS

DE 102007062077 A1 7/2009

OTHER PUBLICATIONS

European Standard—ETSI EN 300-220-1 (Feb. 2017): "Short Range Devices (SRD) operating in the frequency range 25 MHz to 1000 MHz; Part 1: Technical characteristics and methods of measurement".

*Primary Examiner* — Mohamed Barakat
(74) *Attorney, Agent, or Firm* — Laurence A. Greenberg; Werner H. Stemer; Ralph E. Locher (57) ABSTRACT

Data are transmitted by radio between a terminal and a data collector. The data collector is intermittently or constantly in receive mode. The terminal attempts, from an idle phase, to set up a communication with the data collector in order to send all or some of the data to the data collector and/or to receive them from the data collector. Alternatively, the data collector attempts to set up a communication with the terminal in order to send all or some of the data to the terminal and/or to receive them from the terminal. The setup of the communication is followed by the terminal sending a message to the data collector and the data collector, after receiving the message, continuing, interrupting and/or terminating the transmission of the data during communication on a basis of the content of the message.

27 Claims, 5 Drawing Sheets

(56) References Cited

U.S. PATENT DOCUMENTS

| | | | |
|---|---|---|---|
| 2010/0176967 A1* | 7/2010 | Cumeralto | G01D 4/006 340/870.02 |
| 2012/0056753 A1* | 3/2012 | Chen | H04B 3/546 340/870.02 |
| 2012/0059610 A1* | 3/2012 | Son | G01D 4/002 702/62 |
| 2013/0308685 A1* | 11/2013 | Nagai | H04W 72/02 375/133 |
| 2014/0028465 A1* | 1/2014 | Cornwall | H04Q 9/00 340/870.02 |

* cited by examiner

METHOD FOR TRANSMITTING DATA

CROSS-REFERENCE TO RELATED APPLICATION

This application claims the priority, under 35 U.S.C. § 119, of German patent application DE 10 2018 004 828.5, filed Jun. 15, 2018; the prior application is herewith incorporated by reference in its entirety.

BACKGROUND OF THE INVENTION

Field of the Invention

The present invention relates to a transmission method for transmitting data between a terminal and a data collector by radio. The data collector is intermittently or constantly in receive mode. The terminal attempts, from an idle phase, to set up a communication with the data collector in order to send all or some of the data to the data collector and/or to receive them from the data collector, or the data collector attempts to set up a communication with the terminal in order to send all or some of the data to the terminal and/or to receive them from the terminal.

Terminals of the type in question are, for example, intelligent consumption meters, also called smart meters. These are usually consumption meters or utility meters, e.g. for heat, electricity, gas or water, associated with residential, industrial or commercial units and incorporated into a supply grid. In this case, the smart consumption meters indicate actual consumption to the respective service user and transmit said consumption to a superordinate central unit, e.g. the control center of the supplier. Thus, smart consumption meters have the advantage that manual recordings of the meter readings are dispensed with and the supplier can perform shorter-term billing according to actual consumption. Shorter-term recording intervals in turn allow more accurate coupling of end customer tariffs to the trend in market electricity prices. Supply grids can also be utilized much better.

The measurement data obtained from the consumption meters are normally transmitted in the form of data packets or messages by radio, for example in the ISM (Industrial, Scientific, Medical) band or SRD (Short Range Devices or short range radio) band frequency band, to superordinate data collectors or concentrators that store the data and transmit them on to the central unit. These frequency bands have the problem that the commonness of use of such frequency bands for a wide variety of technical devices, such as, for example, garage door controllers, baby monitors, alarm systems, WLAN, Bluetooth, smoke alarms or the like, means that interference can frequently arise, as a result of which the probability of a successful transmission is reduced.

Further, energy efficiency is of great importance to the consumption meters of the type in question, since consumption meters today are normally battery operated and should have the longest possible maintenance intervals. Frequent data dispatches and increased reception standby times, what are known as reception windows, shorten battery life immensely, but improve transmission quality or safety of transmission, i.e. the probability of a successful transmission of the data. In this case, a compromise is normally chosen that involves a just sufficient transmission and reception standby time with sufficient safety of transmission being chosen that still seems acceptable from the point of view of energy. Accordingly, there is a strong interest in reducing the power requirement of consumption meters and improving safety of transmission.

German published patent application DE 10 2007 062 077 A1 discloses a method for transmitting the measurement data from consumption meters to a data collector by radio in which the data collector is intermittently or constantly in receive mode and the consumption meter is for most of the time in an idle phase, i.e. is not on transmission standby. The consumption meter periodically changes to transmit standby and attempts to set up a bidirectional radio connection to the data collector, the consumption meter transmitting a short radio signal on a first channel and then switching to receive mode on a second channel, i.e. opening a reception window in order to receive a possible response from the data collector. If the data collector responds, e.g. with a confirmation signal, all or some of the data are transmitted to the data collector on the second channel. Subsequently or if a transmission is not effected, the consumption meter returns to the idle phase again. This is intended to ensure a successful transmission from the consumption meter to the data collector. In this case, radio signals from multiple consumption meters can overlap if they are sent to the data collector at the same time. Also, transmission conditions at the site of a communication subscriber can change abruptly, for example, as a result of an interference source that arises (e.g. another device sending on the respective frequency channel), which means that a successful data transmission cannot take place even after a successful communication setup, as a result of which transmission quality and safety of transmission are reduced. Rather, the entire data transmission needs to be performed again, which has a considerably adverse effect on the power requirement.

SUMMARY OF THE INVENTION

It is accordingly an object of the invention to provide a data transmission method which overcomes the above-mentioned and other disadvantages of the heretofore-known devices and methods of this general type and which provides for a method for transmitting data in which the power requirement for data transmission is reduced and the safety of transmission and transmission quality of the data are improved.

With the foregoing and other objects in view there is provided, in accordance with the invention, a method of transmitting data between a terminal and a data collector by radio, wherein the data collector is intermittently or constantly in receive mode. The method comprising:

attempting with the terminal, from an idle phase, to set up a communication with the data collector in order to send all or some of the data to the data collector and/or to receive data from the data collector; or attempting with the data collector to set up a communication with the terminal in order to send all or some of the data to the terminal and/or to receive the data from the terminal; and following a setup of the communication by sending a message from the terminal to the data collector and upon receiving the message by the data collector, selectively continuing, interrupting or terminating the transmission of the data during the communication based on a content of the message.

In other words, tor the method of the type in question for transmitting data between a terminal, in particular a consumption meter, and a data collector by radio, the data collector is normally intermittently or constantly in receive mode, wherein the terminal attempts, from an idle phase (e.g. standby mode), to set up a communication with the data collector in order to send all or some of the data to the data collector and/or to receive them from the data collector. By way of example, the idle phase may be a period in which, although the terminal records present measurement data, e.g. the present consumption, the transmission and/or reception standby is switched off or at least restricted in order to reduce power consumption. Alternatively, the data collector can also attempt to set up a communication with the terminal via at least one frequency channel in order to send all or some of the data to the terminal and/or to receive them from the terminal. In this case, the terminal changes from the idle phase to receive mode for a prescribed period at intervals of time.

According to the invention, after the setup of the communication and hence during the communication, i.e. the transmission of the data, the terminal sends at least one message to the data collector. By way of example, this message can also be sent repeatedly. The data collector can in this case continue, interrupt and/or terminate the transmission of the data after reception of the message on the basis of a content of the message. This results in the advantage that the duty ratio can be reduced. As a result of the terminal requesting transmission of the data from the data collector by means of the message, the terminal can increasingly remain in the power-saving idle phase. This results in the advantage that the times at which the terminal is active for transmission can be matched to the respective transmission situation. By way of example, the data transmission of the data collector can be interrupted or aborted by the terminal if the frequency channel is subject to interference or occupied, i.e. successful data transmission is probably not possible. This allows power consumption to be improved to an exceptional extent, since unnecessary reception standby times are reduced or even prevented, which allows the durability of the power supply to be substantially extended. Also, the available transmission time (duty ratio) of the data collector can be adapted such that the latter preferably sends only if the probability of a successful transmission of the data is sufficiently high. Further, the safety of transmission and the transmission quality of the data can be increased to an exceptional extent by use of the method as a result of data being transmitted only if transmission conditions e.g. in the region of both communication subscribers are good for preferably the whole period of the data transmission.

Expediently, the terminal can send out a radio call at intervals of time from the idle phase and thereafter change to receive mode for a prescribed period to set up the in particular bidirectional communication with the data collector. The radio call may be e.g. a beacon, a message, a data packet, a data sub-block, a synchronization signal or the like. Alternatively or additionally, the data collector can also send out a radio call to set up the communication with the terminal, the terminal changing to receive mode at intervals of time from the idle phase in order to receive the radio call. Accordingly, either the data collector ("pull" mode) or the terminal ("push" mode) can initiate setup of the communication.

Preferably, the data are transmitted via at least one frequency channel and in the form of data packets that preferably each comprise multiple data blocks that can in turn be split into data sub-blocks (what are known as "hops"). By way of example, multiple data sub-blocks form a data block having a size of 4, 16 or 32 bytes.

Further, if the data collector has received the radio call from the terminal, the data collector can either send the data to the terminal, so that the latter can receive the data, or can send a confirmation signal to the terminal, wherein the terminal, after receiving the confirmation, can send all or some of the data to the data collector, so that the latter receives the data, i.e. a bidirectional communication is effected in which the communication subscribers involved need to confirm the imminent data transmission to one another either by means of the data dispatch of the data collector or by means of a confirmation signal ("handshake"). This allows the safety of transmission to be improved to an exceptional extent.

In the same way, if the data collector has received the radio call from the terminal, it can abort transmission of the data and/or send the terminal a confirmation signal to abort transmission of the data.

Preferably, the terminal sends the message at stipulable intervals of time. The intervals of time can be stipulated in advance, determined randomly or determined pseudo-randomly in this case.

As a result of the terminal sending the message before and/or after one or more data blocks or data sub-blocks and/or pilot sequences in each case, the advantage arises that transmission of the data can be aborted individually by the terminal and/or the data collector, e.g. after a stipulable data sub-block if e.g. the transmission quality is not good enough.

Preferably, transmission of the data is effected on at least one frequency channel, preferably a plurality of frequency channels. This also allows the safety of transmission and the transmission quality of the data to be improved additionally.

Expediently, transmission of the data or of the data packets, data blocks or data sub-blocks can be effected on multiple frequencies or frequency channels using what is known as the frequency hopping method in order to improve the transmission quality of the data. In this case, frequency channels can preferably be selected systematically in order e.g. to hide frequency channels that are subject to interference and to transmit using frequency channels without interference or with less interference.

According to a preferred requirement of the present invention, the terminal and/or the data collector can perform rating of the transmission quality or safety of transmission of the frequency channel or frequency channels. By way of example, the rating can be effected on the basis of interference source detection, signal level (signal power, signal strength), signal-to-noise ratio, signal-to-interference ratio, a probability quotient (LLR value; log likelihood ratio) or the like. This allows the transmission quality to be determined in a simple manner.

Preferably, rating of the transmission quality can be performed such that the reception channel is checked for hidden nodes (what is known as "hidden node detection"). The data transmission can in this case be interrupted or aborted in the preferred manner if there are signals or dispatches from hidden nodes on the reception channel that effect transmission quality, for example.

It is particularly expedient if the message is generated on the basis of the ascertained transmission quality of the respective frequency channel. This results in the advantage that the transmission quality of the respective frequency channel is used to continue, interrupt and/or terminate transmission of the data. By way of example, this allows a data transmission to be aborted as soon as there is no longer an adequate transmission quality.

Preferably, the message comprises start/stop information or a start/stop signal in order to notify the data collector and/or the terminal that transmission of the data needs to be continued, interrupted and/or terminated.

Alternatively or additionally, the message can also comprise ACK (Acknowledgement)/NACK (No Acknowledgement/Negative Acknowledgement) information set up to notify the data collector and/or the terminal of which data dispatches, data packets, data blocks and/or data sub-blocks have been transmitted successfully.

Subsequently, the data collector and/or the terminal can send the unsuccessfully transmitted data repeatedly or multiple times until they have been transmitted successfully. The safety of transmission and the transmission quality are substantially improved thereby.

Expediently, there may be provision for a synchronization sequence for synchronizing the timing and/or synchronizing the frequency of the terminal, on the basis of which the time and/or frequency reference device of the terminal can be synchronized.

According to a preferred variant embodiment of the invention, a stipulable number of data blocks and/or data sub-blocks have respective associated pilot sequences, such as e.g. a preamble, postamble and/or inter or mid-amble, i.e. for example a bit sequence, that are placed in front of, after or between the data blocks or data sub-blocks and are detected as a signal by the receiver.

Preferably, the pilot sequences are part of the synchronization sequence. By way of example, a particular chronological order of the pilot sequences can be used to synchronize the timing of the time reference devices.

Expediently, the terminal can also send the message on a first frequency channel and thereafter be ready to receive on a second frequency channel in order to receive a response from the data collector, such as e.g. a transmission of the data by the data collector, via the second frequency channel. This e.g. also allows random or pseudo-random alternation of the frequency channels to be effected ("ping-pong"), so that a possible attack by third parties is hampered and therefore data security is improved.

The radio connection between the terminal and the data collector can be in particular a bidirectional radio connection that allows e.g. all communication subscribers to send and receive data, signals, radio calls or the like.

Preferably, the reception bandwidth of the reception unit (e.g. the terminal and/or the data collector) is in the narrow-band range. According to a preferred embodiment, the reception bandwidth of the respective reception unit is smaller than 25 kHz, preferably smaller than 20 kHz, preferably smaller than 5 kHz, preferably smaller than 3 kHz, particularly preferably smaller than 2 kHz. The bandwidth can be determined in particular on the basis of the ETSI EN 300 220-1 V3.1.1 standard (as at February 2017).

Expediently, the terminal is a utility meter such as a water, heat quantity, gas or electricity meter or another consumption meter known from the prior art. Furthermore, there may also be provision for alternative terminals, such as e.g. sensors or sensor nodes that record consumption of space or the volume or fill level. These can be, for example, level indicators for trash cans or other storage apparatuses.

According to a preferred embodiment of the invention, there is provision for a multiplicity of terminals and/or data collectors communicating with one another within a communication system.

Preferably, the data rate in the uplink, i.e. from the terminal to the data collector, is higher in comparison with the data rate in the downlink, i.e. from the data collector to the terminal, at least by a factor of 3, preferably a factor of 4, particularly preferably a factor of 5.

According to a particular embodiment, the data rate can be varied within a data packet, a data block and/or a data sub-block. This results in the advantage that data rate or data flow control can be effected within a data packet, so that the data rate can be matched to the respective transmission situation quickly, individually and also during data transmission, which improves transmission quality and the reliability of transmission to an exceptional extent.

Further, there may be provision for at least one transmission pause between the dispatches of the data packets, data blocks and/or data sub-blocks.

Preferably, the duration of the transmission pause is proportioned such that it has at least the same length as the transmission of the data packet or data block or data sub-block in particular in the uplink.

Advantageously, after receiving the message from the terminal, the data collector can therefore slow down or speed up transmission of the data during communication on the basis of the content of the message by virtue of e.g. the duration of the transmission pauses being increased or decreased and/or the data rate being decreased or increased.

Expediently, interruption and/or abortion of the transmission of the data can be followed by a period of time before continuation of the transmission and/or fresh transmission being stipulated. This allows transmission of the data to be moved to a later time. In a simple manner, the period of time can be stipulated by the sending and/or receiving unit, i.e. the terminal and/or the data collector, the stipulated period of time of the respective other unit (terminal or data collector) subsequently being transmitted and if need be confirmed again by said other unit.

Further, the criterion provided for sending of the uplink message from the terminal to the data collector can be the communication quality between data collector and terminal. By way of example, the terminal can send the message in order to provide notification that the downlink communication between the data collector and the terminal, or reception by the terminal, is poor, damaged or less than optimum.

According to an exceptional embodiment of the method, the criterion provided for the sending of the uplink message from the terminal to the data collector can be the status of the power supply of the terminal. Therefore, the terminal can send e.g. a message to the data collector in order to notify the data collector of the status of the power supply of the terminal, for example that the power supply or the energy buffer has a low voltage. This e.g. also allows imminent replacement of the power supply or of the terminal to be indicated.

With the above and other objects in view there is also provided, in accordance with the invention, a method for transmitting data between a terminal and a data collector, such as a consumption meter, by radio. The method comprising:

operating the data collector intermittently or constantly in receive mode;

attempting with the terminal, from an idle phase, to set up a communication with the data collector via at least one frequency channel in order to send all or some of the data to the data collector and/or to receive data from the data collector; or attempting with the data collector to set up a communication with the terminal via at least one frequency channel in order to send all or some of the data to the terminal and/or to receive the data from the terminal; and rating a transmission quality of the respective frequency channel; and forming a decision based on the transmission quality of the respective frequency channel as to whether or not a transmission of the data should take place on the respective frequency channel.

Similarly to the above, the present invention also calls for a method for transmitting data between a terminal and a data collector by radio via at least one frequency channel. In this case, the data collector is intermittently or constantly in receive mode. The terminal attempts at periodic intervals of time, from an idle phase, to set up a communication with the data collector in order to send all or some of the data to the data collector or to receive data from the data collector. By way of example, to this end, the terminal can send a radio call to the data collector from the idle phase and thereafter changes to receive mode for a stipulable period in order to set up the communication with the data collector. Alternatively, the terminal can also change to receive mode from the idle phase for a stipulable period, wherein the data collector, within this period known to it, e.g. sends a radio call to the terminal in order to set up the communication with the terminal. If the respective receiver receives the message, it can send the data or a confirmation signal to the transmitter of the message so as then to transmit all or some of the data, i.e. to send them to the data collector or the terminal. According to the invention, a rating of the transmission quality of the respective frequency channel is performed, a decision being taken on the basis of the transmission quality of the respective frequency channel as to whether or not data transmission should take place via this frequency channel. This results in the advantage that e.g. the data collector can match transmission of the data to the transmission qualities of the respective frequency channels. Further, it would also be possible for particular terminals to be prioritized, e.g. if the last data transmission is further in the past or a terminal is involved that increasingly has poor transmission qualities or has low availability. Safety of transmission and transmission quality are improved considerably thereby.

Preferably, the rating of the transmission quality is effected on the basis of signal power and/or average signal power and/or variation in the signal power on the respective frequency channel. By way of example, transmission quality can be ascertained on the basis of an interference source measurement, the interference source measurement involving the signal power (of the data transmission) being contrasted with the interference source power or being compared with the latter.

Other features which are considered as characteristic for the invention are set forth in the appended claims.

Although the invention is illustrated and described herein as embodied in a method for transmitting data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
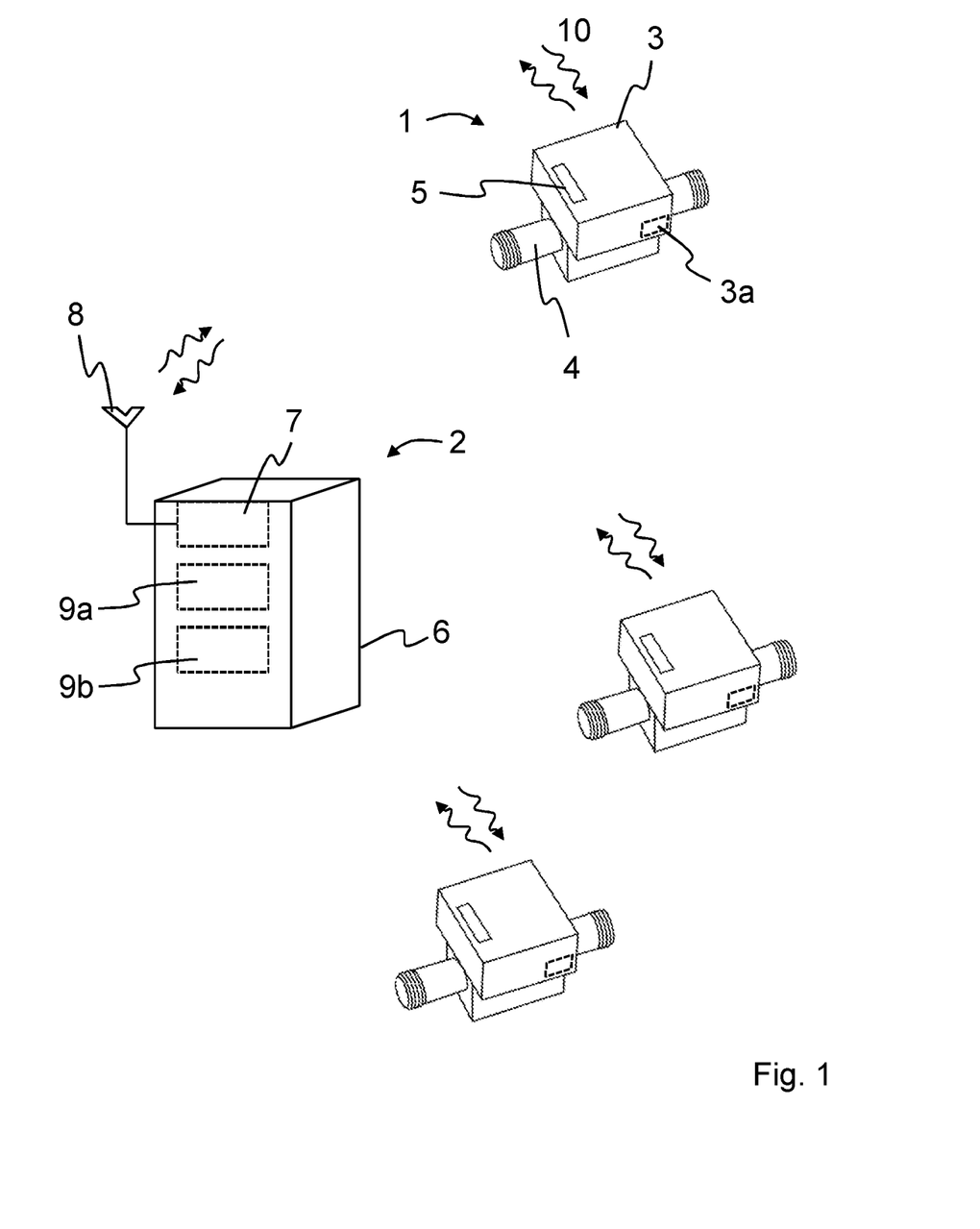
FIG. 1 shows a simplified schematic depiction of an exemplary application of the method according to the invention.

Referring now to the figures of the drawing in detail and first, particularly, to FIG. 1 thereof, there is shown a variety of multiple terminals, embodied as consumption meters 1, and a data collector 2 or data concentrator. Bidirectional transmission of data, e.g. consumption, program or operating data, is effected between the consumption meters 1 and the data collector 2 by radio in accordance with the method according to the invention. The transmission of the data is accordingly a data transmission in which the communication subscribers, such as the consumption meter 1 and the data collector 2, can be both transmitters and receivers. In this case, the data can be transmitted e.g. via the ISM and/or SRD frequency bands.

The consumption meters 1 in FIG. 1 are embodied as fluid meters (e.g. water, gas or heat quantity meters). Each has an electronics housing 3 for holding the electronic components, which are not depicted in FIG. 1 for the sake of clarity, such as e.g. a control and evaluation unit and also a microcontroller and a communication module or communication device. Further, there is provision for a respective power supply 3a for supplying power to the consumption meter 1, such as e.g. a battery or a storage battery. A consumption meter 1 of this kind also comprises an adapter box 4 for connecting the consumption meter 1 to a supply grid, likewise not depicted, such as e.g. the drinking water supply of a household. Further, the consumption meters 1 each comprise a means for determining consumption (likewise not depicted in FIG. 1) that is used to ascertain the consumption of a supply medium. By way of example, this can be an ultrasonic transducer arrangement in which ultrasonic signals are sent in and counter to the direction of flow of the fluid (e.g. water) along a measurement section situated between two ultrasonic transducers. From the propagation time difference in the ultrasonic signals in and counter to the direction of flow of the medium, it is possible to ascertain e.g. the rate of flow and hence the consumption. The ascertained consumption can subsequently be transmitted to the data collector 2 via an antenna of the communication device. Also, there is provision on the consumption meter 1 for a display apparatus, e.g. a display 5, for indicating the present consumption values or the counter reading.

Furthermore, the consumption meters 1 each comprise a time and/or frequency reference device (likewise not depicted) set up to prescribe and/or adjust the time and/or the frequency. The reference device used is, by way of example, a quartz oscillator with a particular error deviation (e.g. 5 ppm). Owing to the error deviation, it may be necessary to synchronize the reference devices, e.g. with the data collector 2 in order to ensure that the time of day stipulated for the data transmission or the stipulated frequency (or frequency channel) is used at the transmitter and receiver ends.

The data collector 2 comprises a housing 6, a communication module 7 having an antenna 8, in particular for transmitting the data, and a data memory 9a for collecting and storing the data. The data collector 2 can transmit the data wirelessly or by wire e.g. to a superordinate central unit, not depicted in the figures, such as e.g. the grid control center of the supplier. Further, the data collector 2 comprises a power supply 9b. This can be a grid connection or an energy store, such as e.g. a battery or a storage battery.

The data collector 2 is intermittently or constantly in receive mode, to receive a data from a consumption meter 1 or the central unit. By contrast, the respective consumption meter 1 is for the most part in an idle phase in which, although the consumption meter 1 ascertains and possibly stores the present consumption, it is preferably not ready to send and/or receive, in order to save power. If the consumption meter 1 wants to send data or is ready to receive data from the data collector 2, such as e.g. program data of a firmware update, the consumption meter 1 can e.g. attempt to set up a communication with the data collector 2 ("PUSH mode"). To this end, the consumption meter 1 can send out a radio call at stipulable intervals of time from the idle phase and thereafter change to receive mode, i.e. open a receive window, for a stipulable period to set up the communication with the data collector 2 in order to receive the response from the data collector 2 or the data or a confirmation signal for the sending of the data by the consumption meter 1. The radio call provided can be e.g. a short signal or some of the data (such as e.g. data packets, data blocks, data sub-blocks or just bits thereof). Alternatively, however, the data collector 2 can also attempt to initiate communication with the consumption meter 1 ("PULL mode") by virtue of the data collector 2 sending out a radio call and the consumption meter 1 changing to receive mode at stipulable intervals of time from the idle phase for a prescribed period. During this reception time, the consumption meter 1 can receive the radio call from the data collector 2 in order to set up the communication between consumption meter 1 and data collector 2. The radio call provided in this case can also be a beacon instead of or in addition to the variants described above.

Expediently, if it has received the radio call from the consumption meter 1, the data collector 2 can send the data to be transmitted to the consumption meter 1. Further, the data collector 2 can also send a confirmation signal to the consumption meter 1 and thus signal to the consumption meter 1 that it needs to send all or some of the data to the data collector 2, so that the latter receives the data, or so that the consumption meter changes to the idle phase again.

Figure 2:
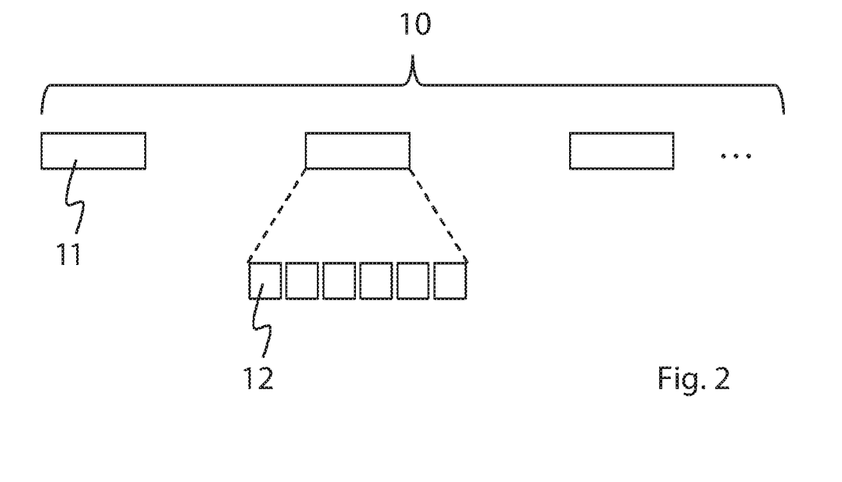
FIG. 2 shows a simplified schematic depiction of a data dispatch comprising multiple data packets.
Figure 3:
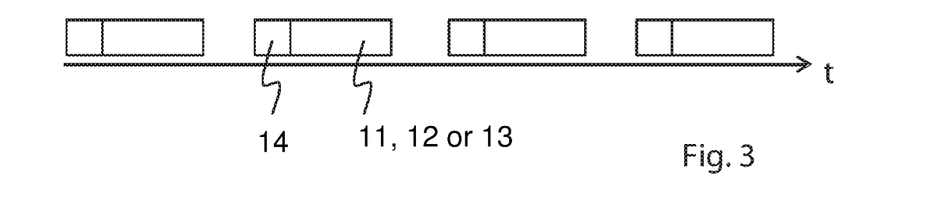
FIG. 3 shows a simplified schematic depiction of a data dispatch having multiple data packets and associated pilot sequences.

FIG. 2 shows a depiction of a data dispatch 10 comprising multiple data packets 11 that are each divided into data blocks 12, which are in turn each split into data sub-blocks 13. By way of example, a data packet can comprise 192 bytes, a data block can comprise 32 bytes and a data sub-block can comprise 4 bytes. The whole data dispatch 10 can be transmitted in one piece or little by little in this case. At least one stipulable number of data blocks 12 and/or data sub-blocks 13 can also comprise a pilot sequence 14, as depicted in FIG. 3. The pilot sequence 14 can be e.g. a preamble, interamble (or mid-amble) and/or postamble, which is placed in front of, between and/or after the respective data blocks 12 and/or data sub-blocks 13 as part of the respective block or as a hop or bit sequence.

The pilot sequences 14 of multiple data blocks 12 or data sub-blocks 13 can serve as a synchronization sequence for synchronizing the time and frequency devices of the consumption meters 1, for example as a result of the pilot sequences 14 being at a defined interval of time from one another that is known to all communication subscribers and from which the time deviation is ascertainable.

The data transmission is preferably effected in the narrowband range, i.e. the reception bandwidth of the respective consumption meter 1 is preferably smaller than 25 kHz, preferably smaller than 20 kHz, preferably smaller than 5 kHz, preferably smaller than 3 kHz, particularly preferably smaller than 2 kHz. In this case, the bandwidth can be determined e.g. on the basis of the ETSI EN 300 220-1 V3.1.1 standard (as at February 2017). Normally, a reception bandwidth of this kind would require longer times in which the consumption meters 1 are ready to receive, i.e. the respective consumption meter 1 would need to be ready to receive for a relatively long time in order to receive the data, which increases power consumption considerably. Therefore, the power of the consumption meter 1 is also additionally consumed if e.g. the relevant frequency channel is currently occupied or subject to interference. Also, the available transmission time, i.e. the duty ratio, of the data collector 2 is wasted by virtue of the latter sending data without the data being able to be received by the consumption meter 1.

Use of the present method allows this problem to be overcome when the consumption meter 1 signals and/or confirms to the data collector 2 the transmission of the data by way of feedback or a message 15 during communication and therefore controlling the data transmission. To this end, the consumption meter 1 sends the message 15 to the data collector 2 at stipulable intervals of time during communication, by means of which the consumption meter 1 notifies the data collector 2 of whether transmission of the data should be continued, interrupted and/or terminated, so to speak data flow control via the consumption meter 1 or the receiver. By way of example, the consumption meter 1 can abort the data transmission thereby.

Figure 4:
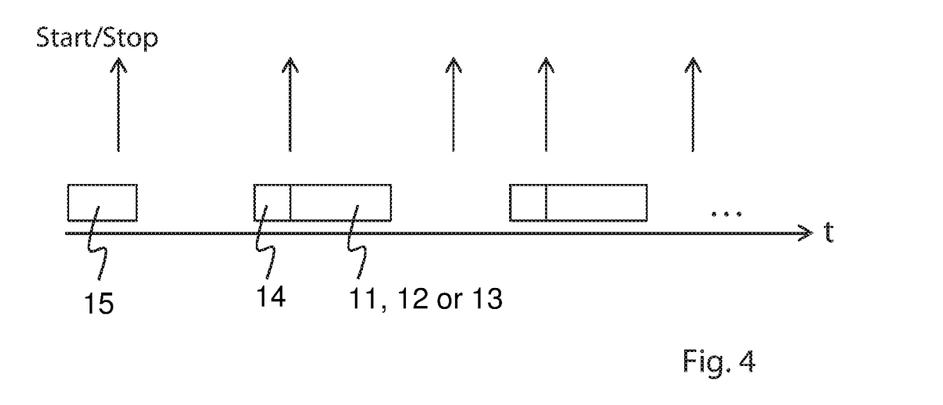
FIG. 4 shows a simplified schematic depiction of an embodiment of a data dispatch with prior detection of hidden nodes.

A transmission of the data can be effected e.g. as a result of detection of hidden nodes (hidden node detection) first of all being performed before the first data packets 11, data blocks 12, data sub-blocks 13 or the pilot sequences 14 thereof are sent by the consumption meter 1, as depicted in FIG. 4. The average signal level and the variation in a signal power on a particular frequency channel are known to the data collector 2 in this case, or are ascertained by it and/or the consumption meter 1, for example as a result of a rating of the transmission quality of the respective frequency channel on the basis of the last transmitted data packets 11, data blocks 12 and/or data sub-blocks 13 and a statistic ascertained therefrom. If the signal level on the respective frequency channel exceeds a stipulable limit value, for example, i.e. has a poor transmission quality, the applicable frequency channel is devalued.

The poor transmission quality can be caused e.g. by interference sources, transmitters and nodes (hidden nodes) that are sending on the same frequency channel and cannot be ascertained via the consumption meter 1 or by the data collector 2. These may e.g. also be another consumption meter 1 wanting to transmit data to the data collector 2. In this case, the data transmission is already aborted and/or moved to a later time. To this end, the consumption meter 1 uses the uplink to send a message 15 to interrupt or terminate the data transmission, e.g. with the information or the content "Stop", to the data collector 2, or the data collector 2 uses the downlink to send a message 15 to interrupt or terminate the data transmission, e.g. with the information or the content "Stop", to the consumption meter 1. If the signal level is below the limit value, i.e. the transmission quality on the frequency channel has been rated as good, the next frequency channel is preferably checked, e.g. by means of the pilot sequences 14 ("synchronization hops") of the first data block 12. If the data blocks 12 or data sub-blocks 13 are not or only partially transmitted, the consumption meter 1 or the data collector 2 again sends a message "Stop" to interrupt or terminate the data transmission to the data collector 2 or the consumption meter 1, whereupon the data transmission from the respective receiver and/or transmitter is interrupted or terminated. By contrast, the consumption meter 1 (or the data collector 2) confirms or begins data transmission by sending e.g. a message 15 with the information "Start" or "Continue" to the data collector 2 (or the consumption meter 1).

Figure 5:
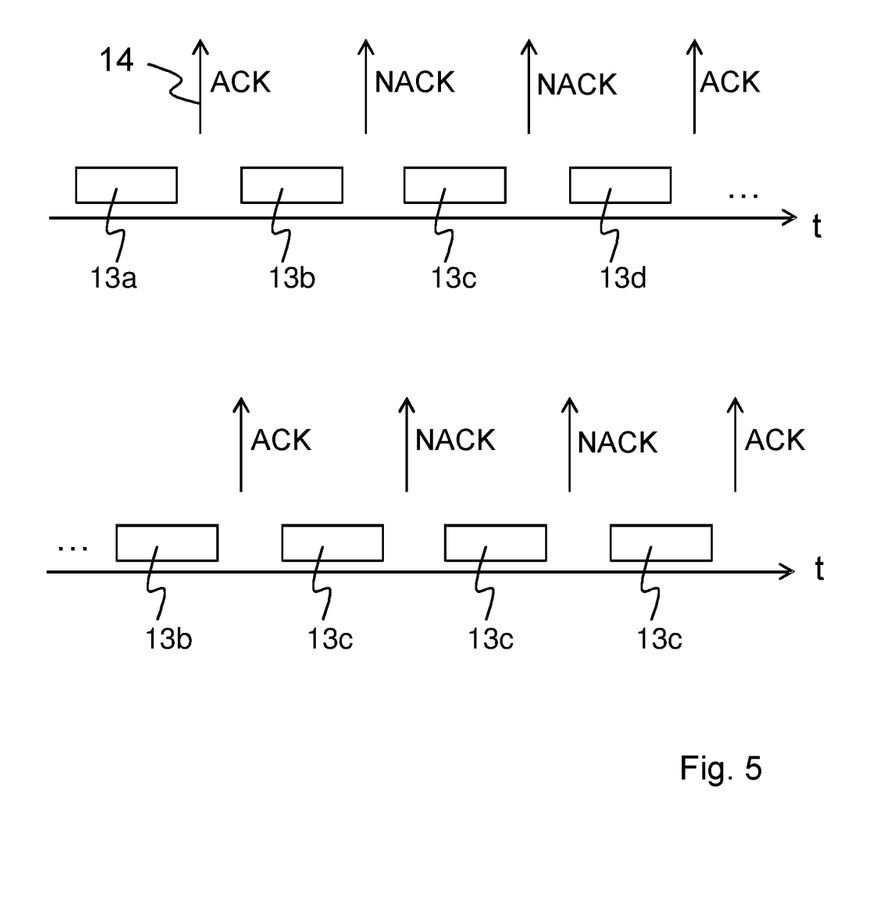
FIG. 5 shows a simplified schematic depiction of a further embodiment of a data dispatch.

The message 15 can therefore comprise start/stop information in order to notify the data collector 2 or the consumption meter 1 that the transmission of the data should be continued, interrupted and/or terminated. Alternatively or additionally, the message 15 comprises ACK/NACK information configured to notify the data collector 2 or the consumption meter 1 of which data, data packets 11, data blocks 12 and/or data sub-blocks 13 have been transmitted successfully. The data packets 11, data blocks 12 and/or data sub-blocks 13 that have not been transmitted or have been transmitted only in part can subsequently be sent repeatedly until they have been transmitted successfully and have consequently been confirmed with ACK information from the receiver to the transmitter. By way of example, the data blocks 12a-12d, as shown in FIG. 5, or the data sub-blocks 13a-13d can be sent until they have been transmitted completely.

Figure 6:
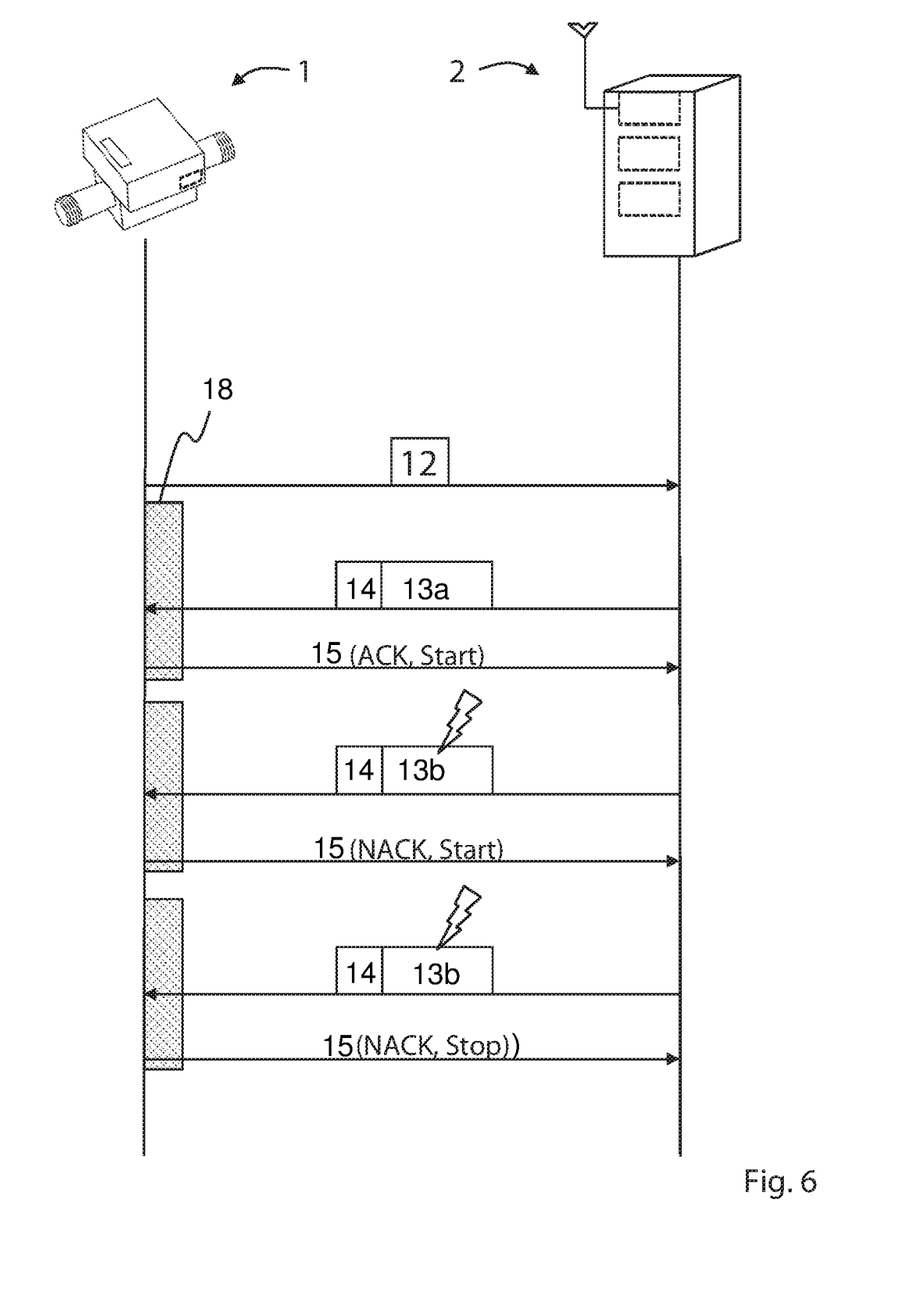
FIG. 6 shows a simplified schematic depiction of a transmission sequence between a consumption meter and a data collector.

An embodiment of a transmission sequence is depicted in FIG. 6, in which the consumption meter 1 first of all sends a radio call to the data collector 2 from the idle phase, e.g. in order to request the data of a firmware update. The radio call used is the data sub-block 13 that the data collector 2 receives. Following the transmission of the radio call, the consumption meter 1 opens a reception window 18, to receive a response from the data collector 2. The data collector 2 then responds by sending the data sub-block 13a with a pilot sequence 14 at the front. The consumption meter 1 receives the data sub-block 13a with the pilot sequence 14, i.e. the communication is therefore already set up when the pilot sequence 14 is received. The consumption meter 1 now sends a message 15 to the data collector 2 notifying the data collector 2 that the data sub-block 13a has been transmitted successfully ("ACK") and transmission should be continued ("Start"). Subsequently, the consumption meter 1 opens a reception window 18 again. After receiving the message 15 (ACK/Start), the data collector 2 in turn responds by sending the data sub-block 13b with the pilot sequence 14. However, the data sub-block 13b is not received successfully by the consumption meter 1, e.g. owing to an interference source on the relevant frequency channel, and the consumption meter 1 then requests the data sub-block 13b again using the message 15 (NACK/Start). The data collector 2 then sends the data sub-block 13b to the consumption meter 1 again.

After the consumption meter 1 has again not been able to receive the data sub-block 13b successfully, the consumption meter 1 aborts the transmission using the message 15 (NACK/Stop) to the data collector 2. Subsequently, the consumption meter changes to the idle phase or the standby mode again in order to save power and to shift transmission of the data to a time with better transmission conditions, e.g. several milliseconds, seconds or minutes later. After receiving the message 15 (NACK/Stop), the data collector 2 also terminates the transmission process. The communication between consumption meter 1 and data collector 2 is therefore terminated. Furthermore, the consumption meter 1 can use the already received pilot sequences 14 for timing and/or frequency synchronization.

Figure 7:
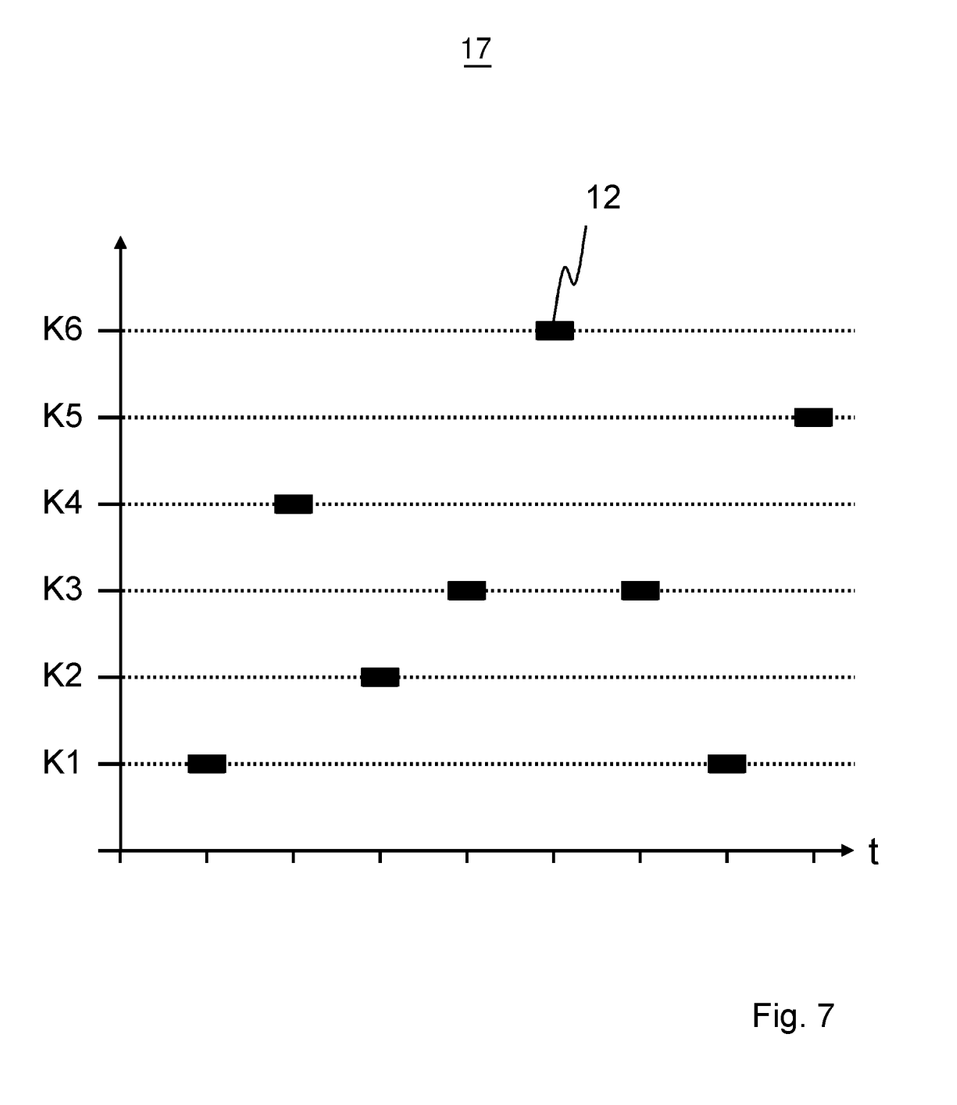
FIG. 7 shows a simplified schematic depiction of a frequency channel pattern.

According to a preferred embodiment of the invention, the transmission of the data can also be performed on the basis of a frequency hopping method in which transmission of the data is effected using, optionally, multiple different frequency channels K1-K6 in order to increase the probability of a successful transmission. By way of example, the data collector 2 can also be notified of a change of frequency channel, proposed by the consumption meter 1, by means of the message 15, said change in turn being confirmed by the data collector 2 by means of a response to the consumption meter 1, in order to bring about the change of frequency channel. A particular sequence of frequency channels K1-K6 by means of which a data packet 11, a data block 12 and/or a data sub-block 13, or just bits or bytes from these, are transmitted in each case is referred to as what is known as a frequency channel pattern 17. FIG. 7 shows a variant embodiment of a frequency channel pattern 17 of this kind in which data sub-blocks 13 are transmitted by means of six different frequency channels K1-K6. However, the invention can also have provision for very many more frequency channels K1-Kn and also multiple frequency channel patterns 17 for transmitting the data or the data packets 11, data blocks 12 and/or data sub-blocks 13.

The content of the disclosure expressly also covers combinations of single features (sub-combinations) and possible combinations of single features of different embodiments that are not depicted in the figures of the drawing.

The following is a summary list of reference numerals and the corresponding structure used in the above description of the invention:

1 Consumption meter
  2 Data collector
  3 Electronics housing
  3a Power supply
  4 Adapter box
  5 Display
  6 Housing
  7 Communication module
  8 Antenna
  9a Data memory
  9b Power supply
  10 Data dispatch
  11 Data packet
  12 Data block
  13 Data sub-block
  13a-13d Data sub-block
  14 Pilot sequence
  15 Message
  16 Detection of hidden nodes
  17 Frequency channel pattern
  18 Reception window
  K1-K6 Frequency channel

The invention claimed is:

1. A method of transmitting data between a terminal and a data collector by radio, the method comprising:
operating the data collector intermittently or constantly in receive mode;
setting up with the terminal, from an idle phase, a communication with the data collector in order to send all or some of the data to the data collector and/or to receive data from the data collector; or setting up with the data collector, a communication with the terminal in order to send all or some of the data to the terminal and/or to receive the data from the terminal; and following the setting up of the communication, sending a message from the terminal to the data collector, and upon receiving the message by the data collector, the data collector selectively continuing, interrupting or terminating the transmission of the data during the communication based on a content of the message;

wherein the data are transmitted as data packets that each include multiple data blocks and/or data sub-blocks;

wherein the data are transmitted on a plurality of frequency channels using a frequency hopping method in which the data, data packets, data blocks and/or data sub-blocks are transmitted on multiple frequency channels;

wherein the message includes start/stop information in order to notify the data collector that the transmission of data is to continue, to interrupt and/or terminate; and wherein the terminal is a consumption meter or a sensor.

2. The method according to claim 1, which comprises sending out with the terminal a radio call at intervals of time from the idle phase and thereafter changing to receive mode for a prescribed time period to set up the communication with the data collector, and/or sending out with the data collector a radio call to set up the communication with the terminal, the terminal changing to receive mode at intervals of time from the idle phase in order to receive the radio call.

3. The method according to claim 1, which comprises, after the data collector has received the radio call of the terminal, sending the data and/or a confirmation signal for transmitting the data from the data collector to the terminal.

4. The method according to claim 1, which comprises, when the data collector has received the radio call of the terminal, aborting with the data collector transmission of the data and/or sending from the data collector to the terminal a confirmation signal for aborting transmission of the data.

5. The method according to claim 1, which comprises sending the message at stipulated intervals of time.

6. The method according to claim 1, which comprises sending the message in each case before and/or after one or more data packets, data blocks, data sub-blocks and/or pilot sequences.

7. The method according to claim 1, which comprises rating a transmission quality of the frequency channels by checking for hidden nodes, and interrupting or aborting the data transmission if hidden nodes are ascertained via the reception channel.

8. The method according to claim 1, which comprises generating the message on a basis of a transmission quality of a respective frequency channel.

9. The method according to claim 1, wherein the message comprises ACK/NACK information in order to notify the data collector and/or the terminal of which data blocks and/or data sub-blocks have been transmitted successfully.

10. The method according to claim 1, which comprises repeatedly transmitting from the data collector or the terminal send unsuccessfully transmitted data repeatedly until the data have been transmitted successfully.

11. The method according to claim 1, which comprises providing a synchronization sequence for synchronizing a timing and/or a frequency of the terminal.

12. The method according to claim 1, wherein the data blocks or the data sub-blocks or a stipulable number of data blocks or data sub-blocks have an associated pilot sequence.

13. The method according to claim 1, wherein the terminal sends the message on a first frequency channel and thereafter is ready to receive on a second frequency channel in order to receive a possible transmission of the data by the data collector on the second frequency channel.

14. The method according to claim 1, which comprises transmitting the data in a bidirectional data transmission.

15. The method according to claim 1, which comprises transmitting the data in a narrowband transmission.

16. The method according to claim 1, wherein the terminal is a consumption meter selected from the group consisting of a water meter, a heat quantity meter, a gas meter and an electricity meter.

17. The method according to claim 1, wherein the terminal is one of a plurality of terminals and/or the data collector is one of a plurality of data collectors.

18. The method according to claim 1, wherein a data rate in an uplink is higher in comparison with a data rate in a downlink by at least a factor of 3.

19. The method according to claim 1, which comprises selectively varying a data rate within a data block and/or within a data sub-block.

20. The method according to claim 1, which comprises providing at least one transmission pause between respective dispatches of the data blocks and/or data sub-blocks, and proportioning a duration of the transmission pause to have a length that is at least as long as the respective data block and/or data sub-block.

21. The method according to claim 20, which comprises, after receiving the message, slowing down or speeding up the transmission of the data with the data collector by selectively increasing or decreasing the duration of the transmission pause and/or by selectively decreasing or increasing a data rate.

22. The method according to claim 1, which comprises following aborting and/or interrupting the data transmission with a stipulated period of time before fresh transmission and/or continuation of the transmission is effected.

23. The method according to claim 1, which comprises sending the message from the terminal in order to provide notification that the communication between the data collector and terminal is poor, damaged or less than optimum.

24. The method according to claim 1, which comprises sending the message from the terminal in order to provide notification of the status of a power supply of the terminal.

25. The method according to claim 1, which comprises rating the transmission quality of a respective frequency channel on a basis of a signal power and/or an average signal power and/or variation in the signal power on the respective frequency channel.

26. The method according to claim 1, which comprises providing a synchronization sequence for synchronizing a timing and/or a frequency of the terminal; wherein the data blocks or the data sub-blocks or a stipulable number of data blocks or data sub-blocks have an associated pilot sequence that is part of the synchronization sequence.

27. The method according to claim 1, which comprises transmitting the data in a narrowband transmission, wherein a reception bandwidth of a respective receiver is smaller than a value selected from the group consisting of 25 kHz, 20 kHz, 5 kHz, 3 kHz, and 2 kHz.

* * * * *